United States Patent
Ashibe et al.

(10) Patent No.: US 7,729,731 B2
(45) Date of Patent: Jun. 1, 2010

(54) TERMINAL STRUCTURE OF SUPERCONDUCTING CABLE

(75) Inventors: Yuuichi Ashibe, Osaka (JP); Takato Masuda, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 908 days.

(21) Appl. No.: 10/591,949

(22) PCT Filed: Feb. 15, 2005

(86) PCT No.: PCT/JP2005/002202

§ 371 (c)(1),
(2), (4) Date: Sep. 8, 2006

(87) PCT Pub. No.: WO2006/087761

PCT Pub. Date: Aug. 24, 2006

(65) Prior Publication Data

US 2007/0191231 A1      Aug. 16, 2007

(51) Int. Cl.
H01B 12/00      (2006.01)
H02G 15/34      (2006.01)

(52) U.S. Cl. .................. 505/220; 505/163; 174/15.3

(58) Field of Classification Search ............ 505/163, 505/220, 230; 174/125.1, 15.3–15.5; 29/599
See application file for complete search history.

(56) References Cited

U.S. PATENT DOCUMENTS 6,525,265 B1    2/2003  Leijon et al.
6,888,060 B2 *  5/2005  Ashibe et al. .......... 174/15.3

FOREIGN PATENT DOCUMENTS

| JP | 10-070828 | * | 3/1998 |
| JP | 2002-238144 A | | 8/2002 |
| RU | 2000116638 A | | 8/2002 |
| WO | WO 99/29005 | | 6/1999 |
| WO | WO 02/065605 | * | 8/2002 |

OTHER PUBLICATIONS

Decision to Grant dated Aug. 1, 2008 for related Russian patent application 2007123021/09(025068).

* cited by examiner

Primary Examiner—Stanley Silverman
Assistant Examiner—Kallambella Vijayakumar
(74) Attorney, Agent, or Firm—Foley & Lardner LLP

(57) ABSTRACT

A terminal structure of a superconducting cable is provided that is capable of preventing degradation in airtightness of a seal provided on the boundary between a room-temperature side and a cryogenic side for a long-term use. The terminal structure includes a terminal of a superconducting cable, a bushing providing electrical conduction with a superconducting conductor of the cable, and a refrigerant bath housing the terminal and the bushing. The refrigerant bath includes a liquid nitrogen layer in its cryogenic side and a nitrogen gas layer in its room-temperature side that are adjacent to each other. In the nitrogen gas layer, distance t between an inner surface of the refrigerant bath and an outer periphery of the bushing is dimensioned such that nitrogen gas is kept in a gaseous state without being pressurized by a pressurizer and respective pressures of nitrogen gas and liquid nitrogen counterbalance each other.

9 Claims, 3 Drawing Sheets

US 7,729,731 B2

TERMINAL STRUCTURE OF SUPERCONDUCTING CABLE

TECHNICAL FIELD

The present invention relates to a terminal structure of a superconducting cable in which a terminal member of the superconducting cable extends from a cryogenic side to a room-temperature side through a bushing. More particularly, the present invention relates to a terminal structure of a superconducting cable capable of maintaining airtightness of a flange placed between the cryogenic side and the room-temperature side for an extended period of time.

BACKGROUND ART

Conventionally, for example, a structure shown in FIG. 5 is known as a terminal structure of a superconducting cable (see Patent Document 1). This terminal structure includes a terminal of a superconducting cable 100, a refrigerant bath 101 housing this terminal, a bushing 102 providing electrical conduction from a superconducting conductor 100a of cable 100 to a room-temperature side, a vacuum container 103 covering an outer periphery of refrigerant bath 101, a porcelain tube 104 protruding from a room-temperature side of vacuum container 103.

Bushing 102 has in its center a conductor 102a which is electrically connected to superconducting conductor 100a via a joint 105 and which is covered with a solid insulator 102b such as ethylene propylene rubber therearound, and is housed along from vacuum container 103 to porcelain tube 104. It is noted that, in the example shown in FIG. 5, stress cones 102c are arranged on an outer periphery of solid insulator 102b in the vicinity of both ends of bushing 102, respectively.

Porcelain tube 104 is filled with an insulating fluid 104a such as an insulating oil and $SF_6$ gas. Refrigerant bath 101 includes a liquid refrigerant layer 101b filled with a liquid refrigerant 101a such as liquid nitrogen supplied from a supply pipe 106 and a gaseous refrigerant layer 101d filled with a refrigerant gas 101c such as helium gas and nitrogen gas in a layer on liquid refrigerant layer 101b in FIG. 5. Refrigerant gas 101c can be discharged through a discharge pipe 107. Refrigerant gas 101c is also maintained in a state pressurized by a pressurizer (not shown) so that liquid refrigerant 101a may not rise to the room-temperature side.

Vacuum container 103 in a cryogenic side and porcelain tube 104 in the room-temperature side are separated by a flange 108. This flange 108 is usually provided with a seal 109 to keep airtightness in order to prevent refrigerant gas 101c of gaseous refrigerant layer 101d from entering porcelain tube 104 in the room-temperature side.

Patent Document 1: Japanese Patent Laying-Open No. 2002-238144 (FIG. 3)

DISCLOSURE OF THE INVENTION

Problems to be Solved by the Invention

However, the conventional terminal structure mentioned above has a problem in that a long-term use may cause the seal of the flange to be cooled by a refrigerant to cure, and thereby to deteriorate in its sealing performance to leak the refrigerant gas into the room-temperature side, in other words, it is possible that the airtightness cannot be kept.

Thus, a main object of the present invention is to provide a terminal structure of a superconducting cable capable of preventing degradation in airtightness of a seal provided on the boundary between a room-temperature side and a cryogenic side for a long-term use.

Means for Solving the Problems

The present invention accomplishes the aforementioned object by defining dimensions of a gaseous refrigerant layer. Specifically, the present invention is a terminal structure of a superconducting cable, a terminal member of the superconducting cable extending from a cryogenic side to a room-temperature side through a bushing, characterized in that the terminal structure includes, in the cryogenic side, a refrigerant bath cooling the bushing, the refrigerant bath includes a gaseous refrigerant layer and a liquid refrigerant layer, and, in the gaseous refrigerant layer, the distance between an inner surface of the refrigerant bath and an outer periphery of the bushing is dimensioned such that a gaseous state is maintained without being pressurized by a pressurizer and respective pressures of a gaseous refrigerant and a liquid refrigerant counterbalance each other.

Conventionally, in the gaseous refrigerant layer, the inner surface of the refrigerant bath and the outer periphery of the bushing are spaced widely apart as shown in FIG. 5 so as to ensure a sufficient insulation distance, and also spaced widely apart in the vicinity of the flange provided on the boundary between the room-temperature side and the cryogenic side. Specifically, for example, if the bushing diameter is approximately 150 mm $\phi$, the width of the refrigerant bath in the vicinity of the flange (the distance between inner surfaces) is approximately 400 mm, that is, the distance between the inner surface of the refrigerant bath and the outer periphery of the bushing is approximately 125 mm.

However, the inventors of the present invention have found out that the width of the refrigerant bath in the vicinity of the flange (the distance between the inner surface of the refrigerant bath and the outer periphery of the bushing) is so broad that a gentle temperature gradient from the cryogenic side to the room-temperature side cannot be established and the seal provided in the flange is cooled by the gaseous refrigerant and the liquid refrigerant coming up and is accordingly cured to deteriorate airtightness. The length in the direction from the cryogenic side toward the room-temperature side of the gaseous refrigerant layer may be extended in order to establish the gentle temperature gradient. However, this extension of the length results in an increase in size of the refrigerant bath and the vacuum container and thus the terminal structure. Therefore, the present invention implements a more compact configuration not by extending the length in the direction from the cryogenic side toward the room-temperature side of the gaseous refrigerant layer, but by decreasing the distance between the inner surface of the refrigerant bath and the outer periphery of the bushing specifically in the vicinity of the flange.

In addition, the decreased distance between the inner surface of the refrigerant bath and the outer periphery of the bushing helps increase the pressure of the gaseous refrigerant. Therefore, by adjusting the dimensions of the gaseous refrigerant layer as appropriate, the gaseous refrigerant can be kept in a gaseous state without pressurization by a pressurizer as in the conventional cases. Thus, the terminal structure can be made more compact without the need to provide a pressurizer additionally.

According to the present invention, the bushing includes a conductor capable of providing electrical conduction with a superconducting conductor of the superconducting cable and a solid insulator covering an outer periphery of the conductor.

The conductor of the bushing may be formed by an electrically conductive material such as metal like copper and aluminum (both having resistivity at 77K $\rho=2\times10^{-7}$ Ω·cm) with low electrical resistance even near the refrigerant temperature at which the superconducting cable is used, for example, the temperature of liquid nitrogen when liquid nitrogen is used as a refrigerant. The solid insulator may be an insulating resin, for example, an insulating rubber material such as ethylene propylene rubber and preferably be fiber reinforced plastics (FRP) because its insulation performance is so high that the width of the gaseous refrigerant layer (the distance between the inner surface of the refrigerant bath and the outer periphery of the bushing) can be narrowed. In particular, it is preferable that the refrigerant bath is made of such metal as stainless steel and that a solid insulator is used that is structured to include a member of FRP having its outermost layer covered with such metal as stainless steel to thereby allow the opposite surfaces respectively of the refrigerant bath and the bushing to be metal. Therefore, a so-called bayonet structure is implemented and thus the width of the gaseous refrigerant layer can be narrowed.

It is preferable that the refrigerant bath is provided within a vacuum container having a vacuum thermal insulating layer, and also preferable that the refrigerant bath is made of metal such as stainless steel with excellent strength. This configuration may be similar to that of the conventional vacuum container and refrigerant bath.

As for the dimensions of the gaseous refrigerant layer, the distance between the inner surface of the refrigerant bath and the outer periphery of the bushing is dimensioned such that the gaseous state is maintained without being pressurized by a pressurizer and respective pressures of the gaseous refrigerant and the liquid refrigerant counterbalance each other. Therefore, adjustments may be made depending on the pressure of the liquid refrigerant and an amount of incoming heat and the like. For example, if liquid nitrogen is used as the liquid refrigerant and the pressure is about 0.3 to 0.5 MPa, the distance between the inner surface of the refrigerant bath and the outer periphery of the bushing may be about 0.1 to 2.5 mm and the length of the gaseous refrigerant layer (the distance in the direction from the cryogenic side toward the room-temperature side) may be about 300 to 500 mm. A decreased length of the gaseous refrigerant layer increases the distance between the inner surface of the refrigerant bath and the outer periphery of the bushing. Therefore, it is preferable that the length and distance are selected so as to provide the terminal structure of the desired dimensions.

Regarding supply of the gaseous refrigerant and the liquid refrigerant into the refrigerant bath, it is preferable that, for example, the gaseous refrigerant is first supplied into the refrigerant bath and thereafter the liquid refrigerant is supplied thereinto so as to counterbalance respective pressures of the gaseous refrigerant and the liquid refrigerant. Then, it is preferable that the refrigerant bath is hermetically sealed to keep the pressures in equilibrium and thereby to keep the gaseous refrigerant in a pressurized state without being pressurized by a pressurizer. In this case, it is preferable that the liquid refrigerant is cooled by a refrigerator so that it can be maintained at an appropriate temperature. The liquid refrigerant may also be circulated for cooling. Although movement of the liquid refrigerant may more or less cause a change in level of the liquid surface, the pressure of the liquid refrigerant can be adjusted to counterbalance respective pressures of the gaseous refrigerant and the liquid refrigerant to thereby keep its counterbalanced state.

Refrigerants used for the gaseous refrigerant layer and the liquid refrigerant layer may be either same or different type. For example, there are nitrogen gas and helium gas and the like that may be used as a refrigerant for the gaseous refrigerant layer, and there is, for example, liquid nitrogen that may be used as a refrigerant for the liquid refrigerant layer.

According to the present invention, the gaseous refrigerant of the gaseous refrigerant layer is in a pressurized state. Therefore, the liquid refrigerant is pressed against the cryogenic side to prevent the liquid refrigerant from leaking into the room-temperature side. It is preferable that a leakage prevention member is additionally provided so that leakage of the liquid refrigerant can be prevented more effectively. The shape of the leakage prevention member may be any shape which can restrain the liquid refrigerant from leaking into the room-temperature side. For example, the leakage prevention member may have the shape of a ring which can be fit on the outer periphery of the bushing to allow the bushing to pass therethrough. Alternatively, the leakage prevention member may have the shape which can be fit in the refrigerant bath at and around the boundary between the gaseous refrigerant layer and the liquid refrigerant layer. The material of the leakage prevention member may be a rubber base resin material such as ethylene propylene rubber, and preferably be a silicon base resin material because of its excellent resistance to a refrigerant such as liquid nitrogen.

Effects of the Invention

In the terminal structure of the present invention, the specific size of the gaseous refrigerant layer as mentioned above can provide a gentle temperature gradient from the cryogenic side to the room-temperature side without excessively increasing the length of the gaseous refrigerant layer. Thus, although there has been such a problem as degradation in sealing performance due to curing of the seal of the flange that is resultant from cooling of the seal by the gaseous refrigerant, this problem can be prevented. Therefore, the terminal structure of the present invention can restrain the degradation of airtightness of the seal of the flange for a long-term use to achieve the prevention of leakage of the gaseous refrigerant into the room-temperature side.

Furthermore, in the terminal structure of the present invention, the liquid refrigerant can be pressed against the cryogenic side to prevent it from rising into the room-temperature side because the gaseous refrigerant in the gaseous refrigerant layer is in a pressurized state by itself without using a pressurizer. Therefore, the temperature gradient of the gaseous refrigerant layer is maintained, so that the degradation in the sealing performance of the seal of the flange can be prevented.

In addition, in the terminal structure of the present invention, the gaseous refrigerant is in a pressurized state without using a pressurizer. Therefore, a pressurizer for the gaseous refrigerant layer can be eliminated and the number of components can be reduced.

DESCRIPTION OF THE REFERENCE SIGNS 10 bushing, 10a conductor, 10b solid insulator, 10c upper shield, 11 refrigerant layer, 11a inner surface, 11b vacuum insulating layer, 12 vacuum container, 13 liquid nitrogen layer, 13a liquid nitrogen, 14 nitrogen gas layer, 14a nitrogen gas, 15 refrigerator, 20 ring-shaped member, 21 block-shaped member, 100 superconducting cable, 100a superconducting conductor, 100b, 105 joint, 101 refrigerant layer, 101a liquid refrigerant, 101b liquid refrigerant layer, 101c gaseous refrigerant, 101d gaseous refrigerant layer, 102 bushing, 102a conductor, 102b solid insulator, 102c stress cone, 103 vacuum container, 104 porcelain tube, 106 supply pipe, 107 discharge pipe, 108 flange, 109 seal

BEST MODES FOR CARRYING OUT THE INVENTION

Hereinafter will be described embodiments of the present invention.

Embodiment 1

Figure 1:
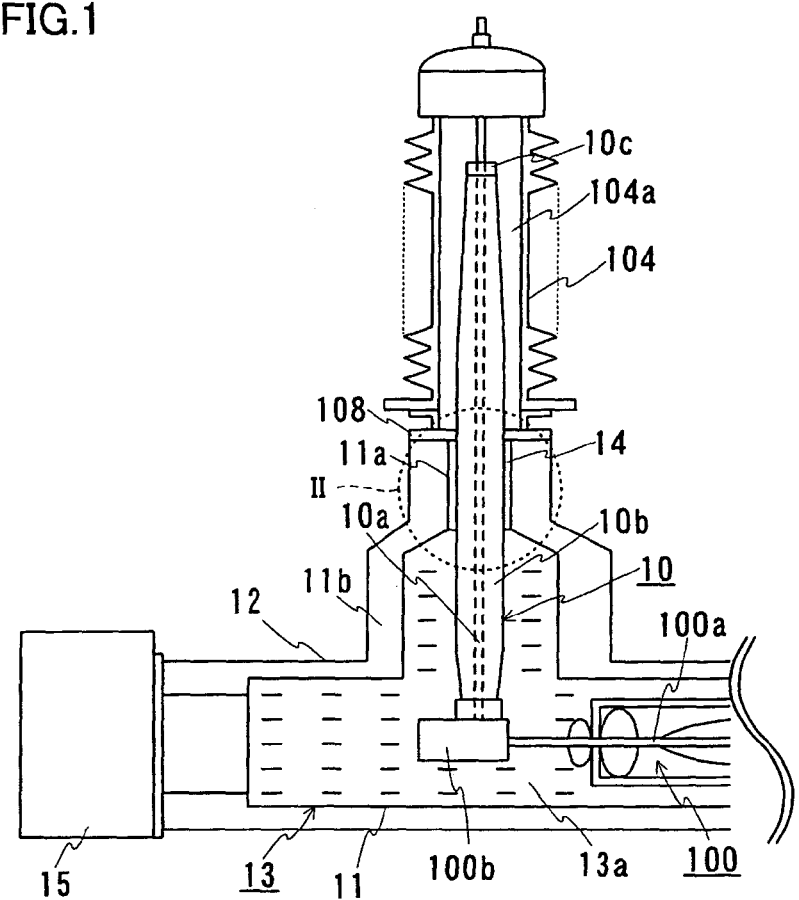
FIG. 1 is a schematic diagram of a terminal structure of a superconducting cable of the present invention.
Figure 2:
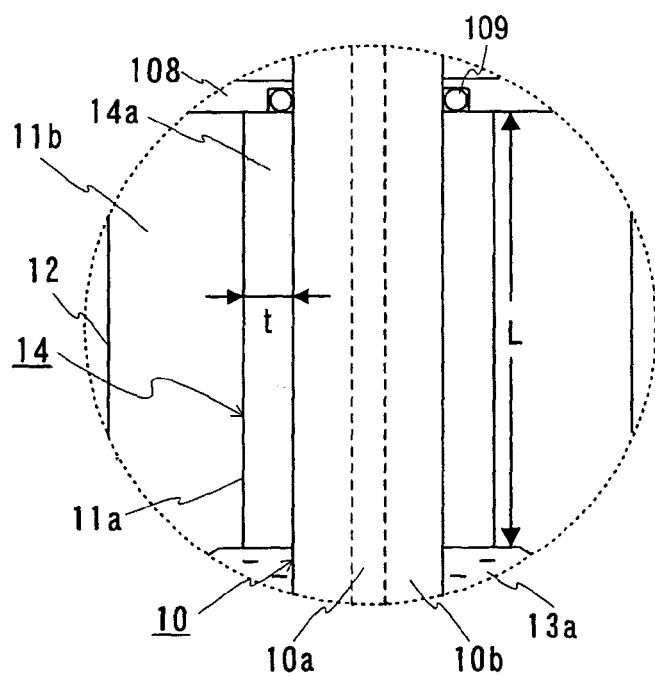
FIG. 2 is a partially enlarged view of a region II in FIG. 1.
Figure 5:
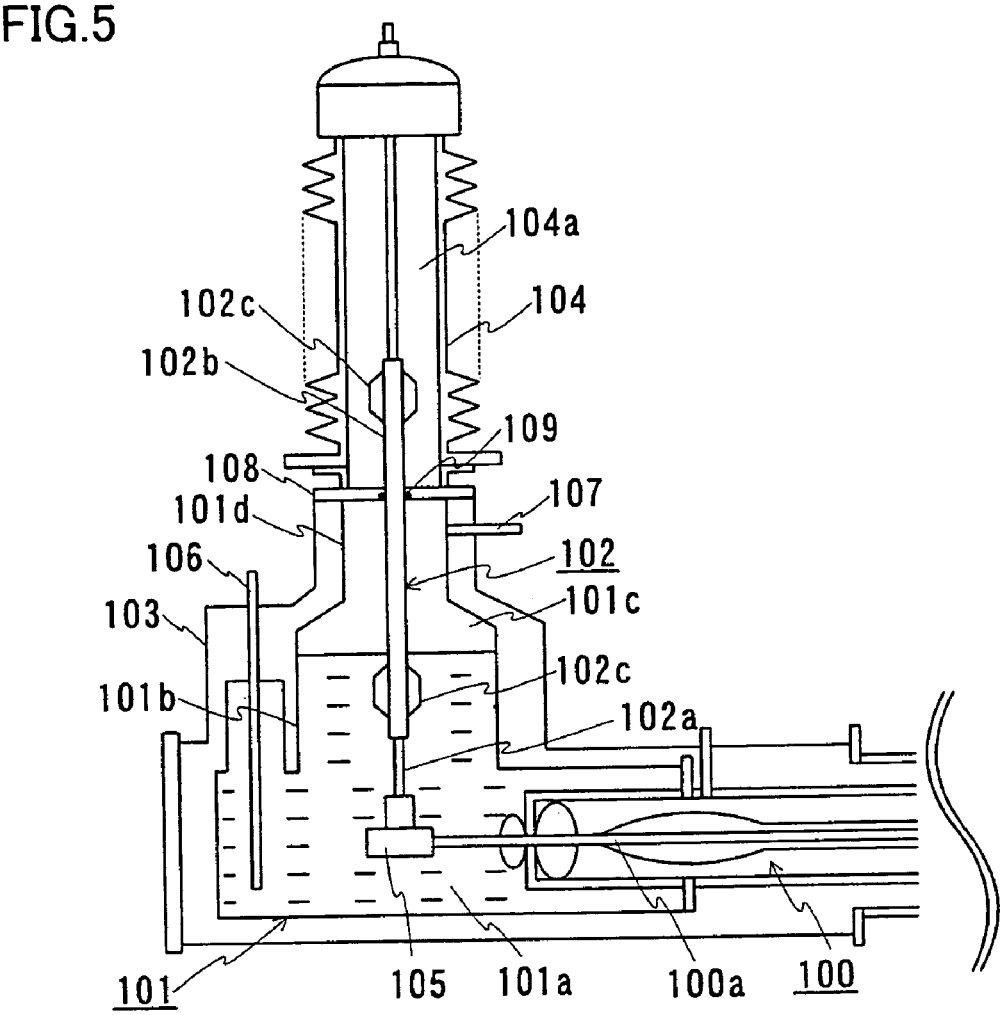
FIG. 5 is a schematic diagram of a terminal structure of a conventional superconducting cable.

Referring to FIGS. 1 and 2, a terminal structure of a superconducting cable of the present invention is described. It is noted that the same reference characters in the drawings indicate the same components. This terminal structure is similar in its basic structure to that of the conventional superconducting cable shown in FIG. 5. In other words, this terminal structure includes a terminal of a superconducting cable 100, a bushing 10 connected to a superconducting conductor 100a of cable 100 to provide electrical conduction from a cryogenic side to a room-temperature side, a refrigerant bath 11 housing the terminal of cable 100 and bushing 10, a vacuum container 12 covering an outer periphery of refrigerant bath 11, and a porcelain tube 104 protruding from a room-temperature side of vacuum container 12. Refrigerant bath 11 includes a liquid nitrogen layer (a liquid refrigerant layer) 13 in its cryogenic side and a nitrogen gas layer (a gaseous refrigerant layer) 14 in its room-temperature side that are adjacent to each other. A flange 108 is placed between the cryogenic side and the room-temperature side and, in flange 108, a seal 109 is provided on the boundary with an outer periphery of bushing 10 to provide airtightness.

The present invention is characterized by the dimensions of nitrogen gas layer 14, and specifically in that distance t between an inner surface 11a of refrigerant bath 11 and the outer periphery of busing 10 is dimensioned such that nitrogen gas is kept in a gaseous state without being pressurized by a pressurizer and the pressure of nitrogen gas and the pressure of liquid nitrogen counterbalance each other. Each configuration will be described in detail as follows.

Bushing 10 (140 mm in diameter) used in the present example includes a conductor 10a (40 mm φ in diameter) capable of providing electrical conduction with superconducting conductor 100a of superconducting cable 100 and a solid insulator 10b (50 mm in thickness) covering an outer periphery of conductor 10a. Superconducting conductor 100a and conductor 10a of busing 10 are connected via a joint 100b. Conductor 10a used in the present example is made of copper with low electrical resistance at a temperature near the temperature of liquid nitrogen. Solid insulator 10b is formed by FRP having excellent insulation. Furthermore, in the present example, an upper shield 10c made of copper is provided on the upper end of bushing 10 (an end provided in the room-temperature side) in FIG. 1.

In the present example, refrigerant bath 11 is formed of stainless steel and housed within vacuum container 12 which is also formed of stainless steel. Vacuum container 12 and refrigerant bath 11 are configured to have a vacuum insulating layer 11b therebetween. This refrigerant bath 11 includes liquid nitrogen layer 13 and nitrogen gas layer 14. Liquid nitrogen layer 13 is connected to a refrigerator 15 for cooling a liquid nitrogen 13a.

In the present example, refrigerant bath 11 is filled with nitrogen gas in order to remove moisture and the like within refrigerant bath 11 before liquid nitrogen 13a is supplied into refrigerant bath 11. Liquid nitrogen 13a is then supplied to liquid nitrogen layer 13 and nitrogen gas is allowed to remain in a portion of refrigerant bath 11, specifically in the vicinity of flange 108 provided on the boundary between the cryogenic side and the room-temperature side. This portion where the nitrogen gas remains is nitrogen gas layer 14. In the present example, nitrogen gas layer 14 has distance t of 2.5 mm between an inner surface 11a of refrigerant bath 11 and the outer periphery of bushing 10 as well as length L of 400 mm. In this case, liquid nitrogen is supplied into refrigerant bath 11 to hermetically seal refrigerant bath 11 so that the pressure of liquid nitrogen within refrigerant bath 11 is about 0.5 MPa. This configuration allows the gaseous state to be maintained by the pressure of nitrogen gas itself and respective pressures of nitrogen gas 14a and liquid nitrogen 13a to almost counterbalance each other.

The terminal structure of the superconducting cable of the present invention having the above-mentioned configuration can provide a gentle temperature gradient from the cryogenic side toward the room-temperature side without excessively increasing the length of the gaseous refrigerant layer. This can effectively prevent the degradation of the sealing property resulting from the curing of the seal provided in the flange by excessive cooling. Therefore, the superconducting cable of the present invention can maintain airtightness between the room-temperature side and the cryogenic side for long-term use. Further, since the terminal structure of the superconducting cable of the present invention does not need a pressurizer for keeping the gaseous refrigerant within the gaseous refrigerant layer in a gaseous state, pressurizing equipment can be eliminated and the terminal structure can further be downsized.

Test Example

The bushing of the above-mentioned Embodiment 1 was used to change dimensions (thickness t and length L) of the nitrogen gas layer for checking the condition of deterioration of the seal provided in the flange. The pressure of liquid nitrogen was changed in the range of 0.3 to 0.5 MPa depending on thickness t and length L. The seal was checked after keeping it under the above-mentioned condition for sixty hours. It was shown that the seal having thickness t of 0.1 to 2.5 mm and length L of 300 to 500 mm had sufficient sealing performance with almost no curing. It was also shown that a smaller thickness t and a larger length L facilitate establishing the temperature gradient. It is noted that although the above-mentioned Embodiment 1 shows the configuration which does not circulate the refrigerant, it may be circulated. In this case, it is preferable that the pressure of liquid nitrogen is adjusted in the range of 0.3 to 0.5 MPa depending on thickness t and length L so that it is counterbalanced with the pressure of nitrogen gas.

Embodiment 2

Figure 3:
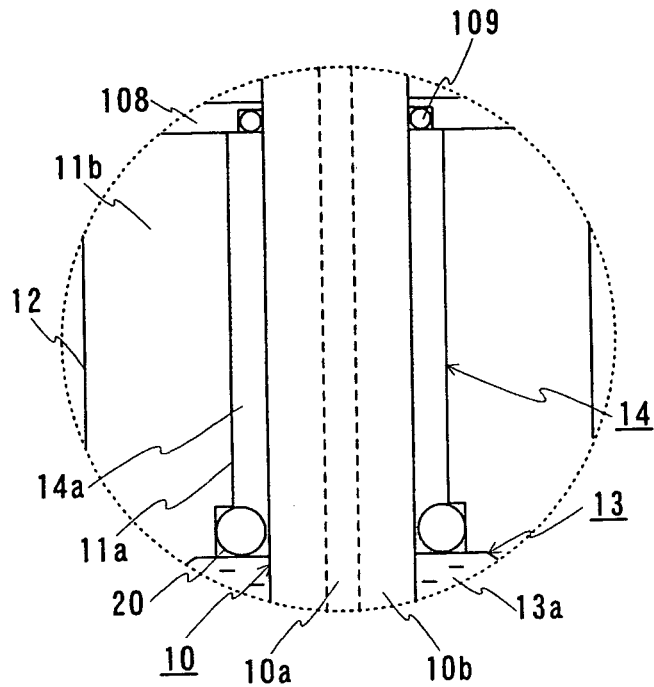
FIG. 3 is an enlarged view of a flange and its vicinity with a ring-shaped member, which is an example having a leakage prevention member in the terminal structure of the super conducting cable of the present invention.
Figure 4:
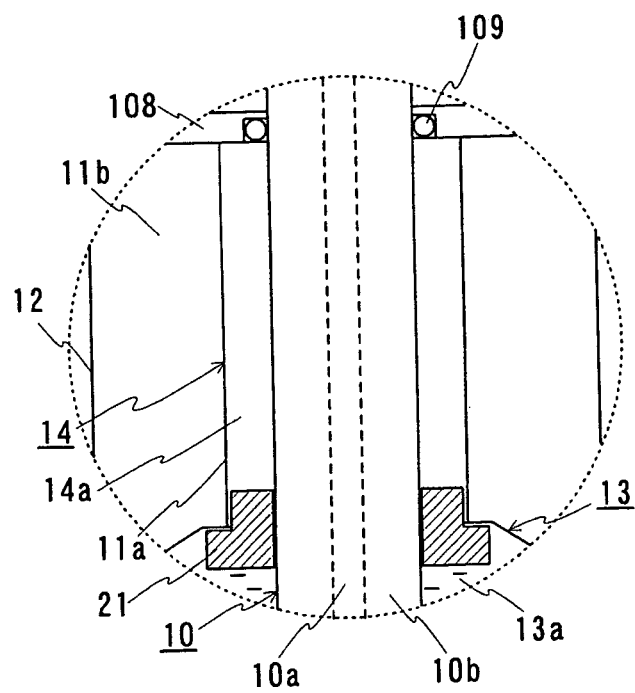
FIG. 4 is an enlarged view of a flange and its vicinity with a block-shaped member, which is an example having a leakage prevention member in the terminal structure of the super conducting cable of the present invention.

In the terminal structure shown in the above-mentioned Embodiment 1, a leakage prevention member may be provided for preventing the liquid refrigerant from leaking into the room-temperature side. Referring to FIGS. 3 and 4, examples of the terminal structure having the leakage prevention member will be described hereinafter.

In an example shown in FIG. 3, in refrigerant bath 11, a ring-shaped member 20 that can be fit on a portion around the boundary between nitrogen gas layer 14 and liquid nitrogen layer 13 is provided around the above-mentioned boundary. Ring-shaped member 20 used in the present example is formed of silicon resin with excellent resistance to liquid nitrogen.

In an example shown in FIG. 4, in refrigerant bath 11, a block-shaped member 21 that is shaped to fit the shape around the boundary between nitrogen gas layer 14 and liquid nitrogen layer 13 is provided around the above-mentioned boundary. Block-shaped member 21 used in the present example is formed of silicon resin with excellent resistance to liquid nitrogen.

By providing the above-mentioned leakage prevention member, the liquid refrigerant can be restrained from leaking into the room-temperature side and the seal of the flange can be prevented from being cooled due to contact with the liquid refrigerant. Note that the above-mentioned leakage prevention member does not completely seal a space between liquid nitrogen layer 13 and nitrogen gas layer 14, but is dimensioned such that the pressure of liquid nitrogen 13a can be applied to nitrogen gas 14a.

INDUSTRIAL APPLICABILITY

The terminal structure of the present invention is preferably applied to an end portion of the superconducting cable.

The invention claimed is:

1. A terminal structure of a superconducting cable comprising,
    a terminal member of the superconducting cable extending from a cryogenic side to a room-temperature side through a bushing, wherein
    the terminal structure includes, in the cryogenic side, a refrigerant bath cooling said bushing,
    said refrigerant bath includes a gaseous refrigerant layer and a liquid refrigerant layer, and
    in said gaseous refrigerant layer, a distance between an inner surface of the refrigerant bath and an outer periphery of the bushing is dimensioned such that a gaseous state is maintained without being pressurized by a pressurizer and respective pressures of a gaseous refrigerant and a liquid refrigerant counterbalance each other;
    wherein the gaseous refrigerant remains in a volume between the inner surface of the refrigerant bath and the outer periphery of the bushing;
    wherein liquid Nitrogen is used as the liquid refrigerant and a pressure of the liquid refrigerant layer is maintained in the range of about 0.3 to about 0.5 MPa;
    wherein the distance between the inner surface of the refrigerant bath and the outer periphery of the bushing for the gaseous layer is in the range of about 0.1 to about 2.5 mm; and
    a longitudinal dimension of the volume occupied by the gaseous refrigerant layer is in the range of about 300 mm to about 500 mm.

2. The terminal structure of the superconducting cable according to claim 1, further comprising a leakage prevention member for preventing the liquid refrigerant from leaking into the room-temperature side.

3. The terminal structure of the superconducting cable according to claim 1, wherein the liquid refrigerant layer is surrounded by a portion of the inner surface of the refrigerant bath and a portion of the outer periphery of the bushing; wherein the portion of the inner surface of the refrigerant bath and the portion of the outer periphery of the bushing are separated by a distance that narrows to form a boundary between the gaseous refrigerant layer and the liquid refrigerant layer such that the distance between the inner surface of the refrigerant bath and the outer periphery of the bushing for the gaseous refrigerant layer is narrowed to at least $\frac{1}{5}^{th}$ of the distance between the inner surface of the refrigerant bath and the outer periphery of the bushing for the liquid refrigerant layer.

4. The terminal structure of the superconducting cable according to claim 3, further comprising a flange separates the room-temperate side of the terminal structure from the cryogenic side of the terminal structure; wherein a distance between the cryogenic side of the flange and the boundary of the liquid refrigerant layer and the gaseous refrigerant define a length dimension of the gaseous layer, wherein the length dimension of the gaseous layer is between 120 to 5000 times greater than the distance between the inner surface of the refrigerant bath and the outer periphery of the bushing for the gaseous layer.

5. The terminal structure of the superconducting cable according to claim 1, wherein the gaseous refrigerant layer comprises Nitrogen.

6. The terminal structure of the superconducting cable according to claim 1, further comprising a ring shaped member separates the gaseous refrigerant layer and the refrigerant liquid layer.

7. The terminal structure of the superconducting cable according to claim 6, wherein the ring shaped member comprises of silicon resin.

8. The terminal structure of the superconducting cable according to claim 1, further comprising a block shaped member separates the gaseous refrigerant layer and the refrigerant liquid layer.

9. The terminal structure of the superconducting cable according to claim 8, wherein the block shaped member comprises silicon resin.

* * * * *